United States Patent [19]

David

[11] Patent Number: 4,856,357
[45] Date of Patent: Aug. 15, 1989

[54] INFINITELY VARIABLE (IV) MECHANICAL NON-CYLINDRICAL DRIVE

[76] Inventor: Constant V. David, 4952 Field St., San Diego, Calif. 92110

[21] Appl. No.: 209,488

[22] Filed: Jun. 21, 1988

[51] Int. Cl.⁴ .............................................. F16H 11/04
[52] U.S. Cl. ......................................... 74/63; 74/216.3
[58] Field of Search .................................. 74/216.3, 63

[56] References Cited

U.S. PATENT DOCUMENTS

| | | | |
|---|---|---|---|
| 2,512,272 | 6/1950 | Gull | 74/63 |
| 2,749,761 | 6/1956 | Mackta | 74/216.3 |
| 2,764,030 | 9/1956 | Mackta | 74/216.3 |
| 3,752,000 | 8/1973 | Roberts | 74/190.5 |
| 4,493,222 | 1/1985 | Heine | 74/216.3 |
| 4,739,668 | 4/1988 | David | 74/63 |

FOREIGN PATENT DOCUMENTS

368996  6/1963  Switzerland ..................... 74/216.3

*Primary Examiner*—Leslie A. Braun
*Assistant Examiner*—Scott Anchell

[57] ABSTRACT

A power-transmitting and torque-converting mechanical drive system provides an infinitely variable (IV) ratio of angular speed adjustments between a first shaft and a second shaft. Power is transmitted by means of a plurality of independent chains of balls pushing one another forward. These balls interact with a first body of revolution mounted on the first shaft and a second body of revolution mounted on the second shaft by means of cooperating groups of balls simultaneously constrained between sets of cooperating straight grooves and corresponding helically-laid grooves located on facing surfaces of the bodies. One group of balls is located between the first body and a plurality of segment structures, whereas the other group of balls is located between the second body and the segment structures equipped with short straight grooves. The balls are guided and restrained in a plurality of closed-loop channels arranged to enable each ball to progressively move along each closed loop, each ball acting like an individual gear tooth. Each ball chain is housed in a channel enclosed in each segment slidable and centered between the body facing grooved surfaces. Torque control features are also provided. Slippage is altogether eliminated. Locking of either one of the shafts restrains the other shaft.

27 Claims, 3 Drawing Sheets

INFINITELY VARIABLE (IV) MECHANICAL NON-CYLINDRICAL DRIVE

BACKGROUND OF THE INVENTION

The present invention relates to a system for transmitting power and converting torque mechanically so as to provide positive linkage between a power input shaft and a powered output shaft in ratios that can be infinitely varied, i.e. infinitely variable ratio or IV. The construction is a hybrid solution to the problem of enabling a gearbox to operate as a hydraulic torque converter, i.e. provide any input-to-output speed ratio between two limit values. The hydraulic analogy stems from the fact that the equivalent of a pump is provided and that the "fluid flow" of that pump drives the equivalent of a hydraulic motor. The "fluid" is replaced herein by mechanical links (balls) which can transmit pressure (push), but cannot exert suction (pull). Those mechanical links provide the positive mechanical connection between the shafts which eliminates the possibility of slippage and provides the additional possibility of positive locking.

In a prior Inventor's patent (U.S. Pat. No. 4,739,669), balls positioned between two cylindrical surfaces of two shafts enable them to be mechanically connected. These balls, when properly guided and restrained, facilitate the transformation of sliding motion into rotating motion (and vice versa) by means of cooperating grooves on two parallel surfaces. In the cited reference, one groove is straight (axially-oriented) and another is helically laid. Two sets of such conjugate grooves and their associated balls, connected as the links of a chain, provide the equivalent of a push rod that can follow and conform to a variety of contoured shapes with a minimum of friction. The state-of-the-art of such technology is old and extensively used in many well-known applications in mechanical engineering.

The use of cylindrical shaft surfaces to locate the helically-laid grooves allows to minimize the drive outer diameter but at the expense of the drive length. For some applications, such as bicycles, it is advantageous to minimize length at the expense of outer diameter. In one embodiment of the present invention, maximum transmission shortening is achieved with the use of spirally-laid grooves located on planar surfaces such as those of two conjugate flanges mounted one on each shaft. The straight grooves are then oriented in a radial direction. For automotive applications such as cars, buses and trucks, shortening of the transmission to an extreme may not be as advantageous and the use of helically-laid grooves on concentric conical surfaces might prove more beneficial. The straight grooves are then oriented along the conical surface generatrices. Spiral grooves on a planar surfaces correspond to the planar projections of helical grooves on conical surfaces. In both instances, the continuous ball-linked chain of the referenced invention must be split into a plurality of independent and unconnected closed ball-linked chains.

It seems that a generalized usage of such construction as optimized for each application may be of considerable advantage. The combination of advantages resulting from the use of an efficient IV torque converter associated with a compact engine-and-transmission assembly will result in appreciable fuel savings and improved vehicle performance.

In view of this background, the present invention provides the advantageous features needed to substantially improve the efficiency and effectiveness of most land vehicles, motorized or not. For the simplicity, compactness and light-weight of its embodiments and constructions thereof also make it very attractive for other popular transportation vehicles, e.g. motorcycles.

SUMMARY OF THE INVENTION

Accordingly, it is a primary object of the present invention to provide a new and improved drive for transmitting power from a mechanical power source by means of an input shaft and output shaft, each equipped with a power member, to a vehicle in a manner such that the transmission ratios between torques and angular speeds of both shafts can be adjusted continuously in a progressive fashion, i.e. to yield an infinitely variable (IV) ratio, for any level of the power so transmitted.

It is another object of the present invention to provide a drive that regulates and controls the torque applied on the input shaft so as to enable the power source to operate at its optimum efficiency and peak effectiveness at all times.

It is another object of the present invention to provide a drive in which the level of the input torque amount can be adjusted and maintained at this level during the operation of the power source for varying torque loads imposed on the output shaft.

It is another object of the present invention to provide a drive that enables structural mobile components to move in a direction intersecting the shaft common axes of rotation so as to allows a drive length reduction.

It is another object of the present invention to provide a drive that eliminates slippage and minimizes friction during its power transmission and torque converting operations.

It is another object of the present invention to provide a drive that can be optimized proportion-wise, i.e. length/diameter ratio, so as to yield a most compact configuration for any given application.

It is still another object of the present invention to provide a drive that eliminates side loads between shaft supports and the drive supporting structure, thus providing a simple, compact and light-weight construction.

DETAILED DESCRIPTION OF THE INVENTION

Figure 1:
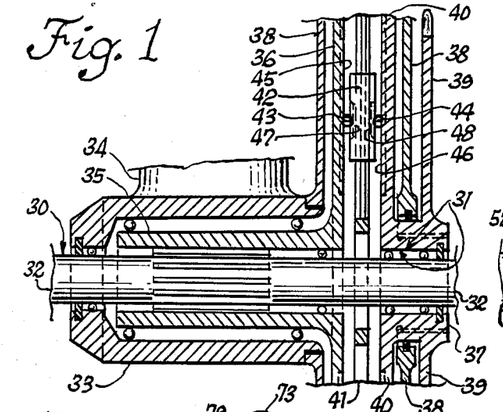
FIG. 1 is a partial elevation cross-section of a planar embodiment of the drive as adapted to bicycle application.

Referring to FIG. 1, a partial sectional view of a planar embodiment of an IV positive drive adapted to a bicycle shows the basic components that cooperate to provide the torque conversion and power transmission from power input shaft assembly 30 to power output shaft assembly 31. Input shaft assembly 30 consists of two main parts:drive axle 32 supported by hub 33 fixed on bicycle structure 34, and hollow shaft 35 spline-mounted on axle 32 and driving grooved flange 36. Output shaft assembly 31 consists of three main parts:- torque axle 37 supported by drive casing 38 held by hub 33, sprocket wheel 39 mounted on axle 37, spirally-grooved flange 40 and a bearing/seal assembly well-known in the art supporting the right side of axle 32. Pedals (not shown) are mounted on axle 32. Two basic components are located between grooved flanges 36 and 40: fixed guiding structure 41 and a plurality of segment structures 42 guided by structure 41 affixed to casing 38. A plurality of balls such as 43 and 44 roll in grooves such as 45 and 46 respectively. They provide the interaction needed between segments 42 and flanges 36 and 40 respectively. The balls are also rolling in and laterally constrained by straight radial grooves 47 and 48 of segment 42 and the helical grooves 45 and 46 of flanges 36 and 40, respectively.

Figure 2:
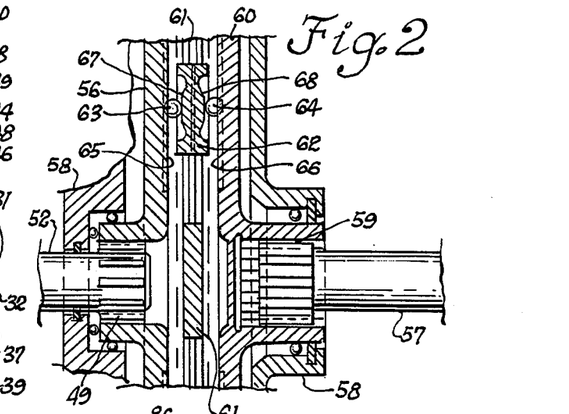
FIG. 2 is a partial elevation cross-section of a planar embodiment of the drive as adapted to automotive application.

The partial sectional view of FIG. 2 depicts a planar embodiment of the invention adapted to automotive application. In this configuration, drive input shaft 52 does not go through the drive assembly, as is the case in FIG. 1, and output shaft 57 is the power transmission shaft of the vehicle. Grooved flanges 56 and 60, spiral grooves 65 and 66 therein, segment 62 and its two straight grooves 67 and 68, casing 58 and structure 61 affixed thereto are easily identifiable because of their similarities with the components of FIG. 1 aleady mentioned. Shafts 52 and 57 are connected to grooved flanges 56 and 60 respectively by splines 49 and 59. A set of balls 63 and 64 is also shown interacting with the grooves in the manner described above.

Figure 3:
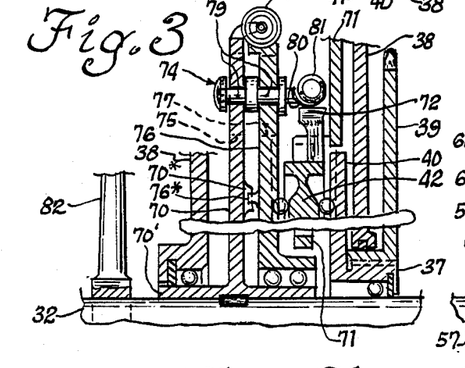
FIG. 3 is a partial elevation cross-section of a torque-control adjustment adapted to the bicycle application of FIG. 1.

In FIG. 3, a system for controlling the amount of input torque applied on the drive includes actuating flange 70 that is key-locked on axle 32 by means of hub 70' that supports casing 38 and spirally-grooved flange 76. Bearings and seal are provided as illustrated in a manner well known in the art. Actuating flange 70 and grooved flange 76 are connected by spring 73 and a plurality of flanged pins 74 that are enabled to slide inside slots 75 and 77 cut in flanges 70 and 76, respectively. Portions 79 of pin 74 engage slots in a manner such that a relative angular displacement between the two flanges causes a radial displacement of pin 74. The right ends of pins 74 are equipped with cupped foils 80 for receiving and accommodating looped tension spring 81 that urges foils 80 to steadily exert an inwardly directed force on stems 72 affixed to segments 42. Portion of pedal 82 is shown on the left end of axle 32. Connections between casing 38 and bicycle frame 34 are omitted here for the sake of simplicity. Fixed structure 71 for guiding segments 48 is attached to casing 38.

Figure 4:
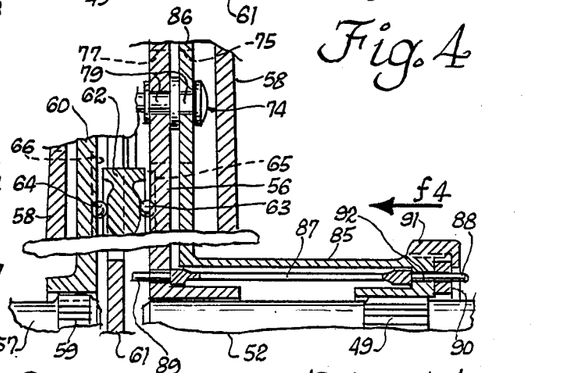
FIG. 4 is a partial elevation cross-section of a torque control adjustment adapted to the automotive application of FIG. 2.

A similar torque control system is depicted in FIG. 4 for use in conjunction with the drive of FIG. 2 (automotive applications). In FIG. 4, the power transmitted is shown flowing in the direction of arrow f. To that effect, input shaft 52 transmits torque to hollow shaft 85 by means of splines 49. Shaft 85 supports actuating flange 86 equipped with slots 75. Spirally-grooved flange 56 free to rotate on the left end of shaft 52 is connected to pins 74 by means of slots 77 and then to flange 86, as previously mentioned in the case of FIG. 3. A torsion sleeve 87 connects the right end of hollow shaft 85 to grooved flange 86 by means of stubs 88 and 89, respectively. Angular adjustment of th torque level at which torsion sleeve 87 is to operate is provided by adjustment ring 90 that can be set and locked by nut 91 in various fixed positions.

Figure 5:
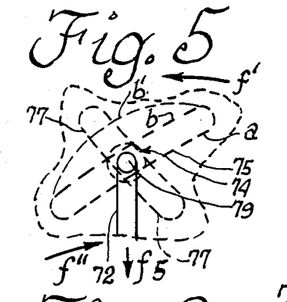
FIG. 5 is a partial plan diagram of the actuation of the control adjustments used for both configurations of FIG. 3 and 4.

FIG. 5 indicates how differential angular displacements of either flanges 70 and 76 or 56 and 86 can cause pin 74 to move in arrow f direction, by means of the interactions of portions 79 of pin 74 with slots 75 and 77. The relative angular displacements of two associated flanges are indicated by arrows f' and f" so as to produce a radial displacement of pin 74 in the direction of arrow f. Such scissoring action by the slots on pin 74 and the ensueing linear motion of pin 74 are well known in the art. Such action occurs at all times as the flanges are rotating in a general direction that may be that shown by either arrow f'or arrow f''.

Figure 6:
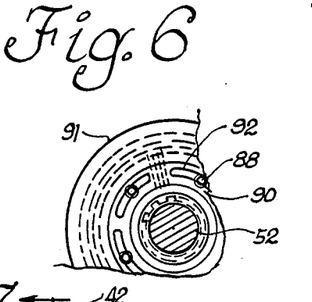
FIG. 6 is a partial end view of the torque level adjustment of FIG. 4 as seen in the direction of arrow f of FIG. 4.

A partial end view of the torque control adjustment previously described in FIG. 4 is shown in FIG. 6. Stubs 88 engage corresponding holes drilled in ring 90 but may assume various selected angular positions in curved slots 92 that are cut in the spilned end of hollow shaft 85. Mechanisms for rendering the angular adjustment of ring 90 possible, while the drive operates, are well known in the art and need not be described here. Suffice it to indicate that a non-rotatable collar positionable along the direction of arrow f of FIG. 4 could be used to define a set relative angular position of ring 90 with respect to hollow shaft 85.

Figure 7:
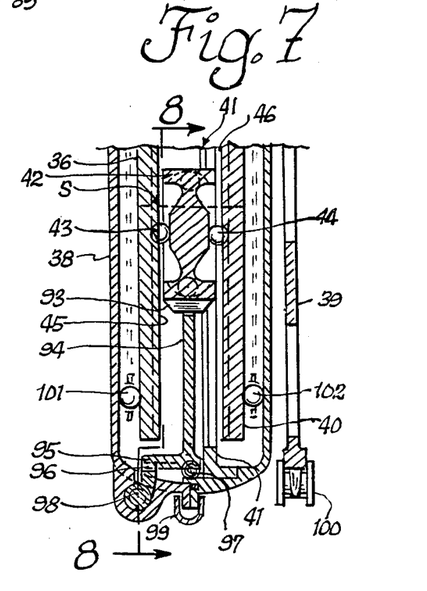
FIG. 7 is a partial sectional view of a speed ratio adjusting system taken along section line 7—7 of FIG. 8.
Figure 8:
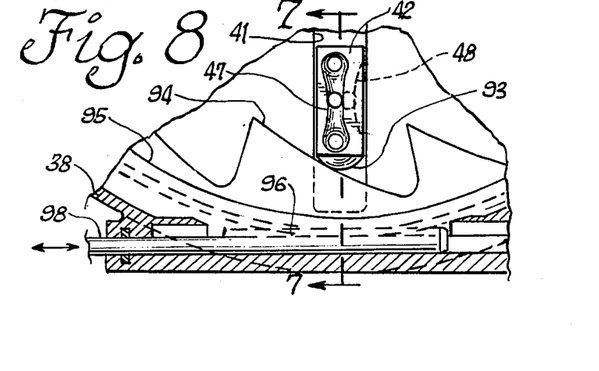
FIG. 8 is a partial sectional view of the speed ratio adjusting system taken along section line 8—8 of FIG. 7.

The partial sectional views of FIG. 7 and 8 show an invention embodiment in which the radial positioning of segments 42 is done directly and positively. To that effect, the outwardly oriented ends of segments 42 are provided with protruding followers 93 that are kept in constant contact with edges of a contoured cam 94, one of such cam being associated with each segment. Cams 94 are mounted on circular rings 95 actuated by rack-pinion assembly 96 and guided by bearing 97. Rack-pinion assembly 96 is actuated by stem 98 guided in casing 38 that is held together by circular clamp 99. Sprocket wheel 39 actuates chain 100 of the bicycle. To prevent flanges 36 and 40 from deforming outwardly, circular thrust bearings 101 and 102 located between the flanges and casing 38 transmit lateral loads applied to the grooved faces of the flanges directly to the casing structure.

Figures 9, 10, 11, 12, 13, 14, 18, 19:
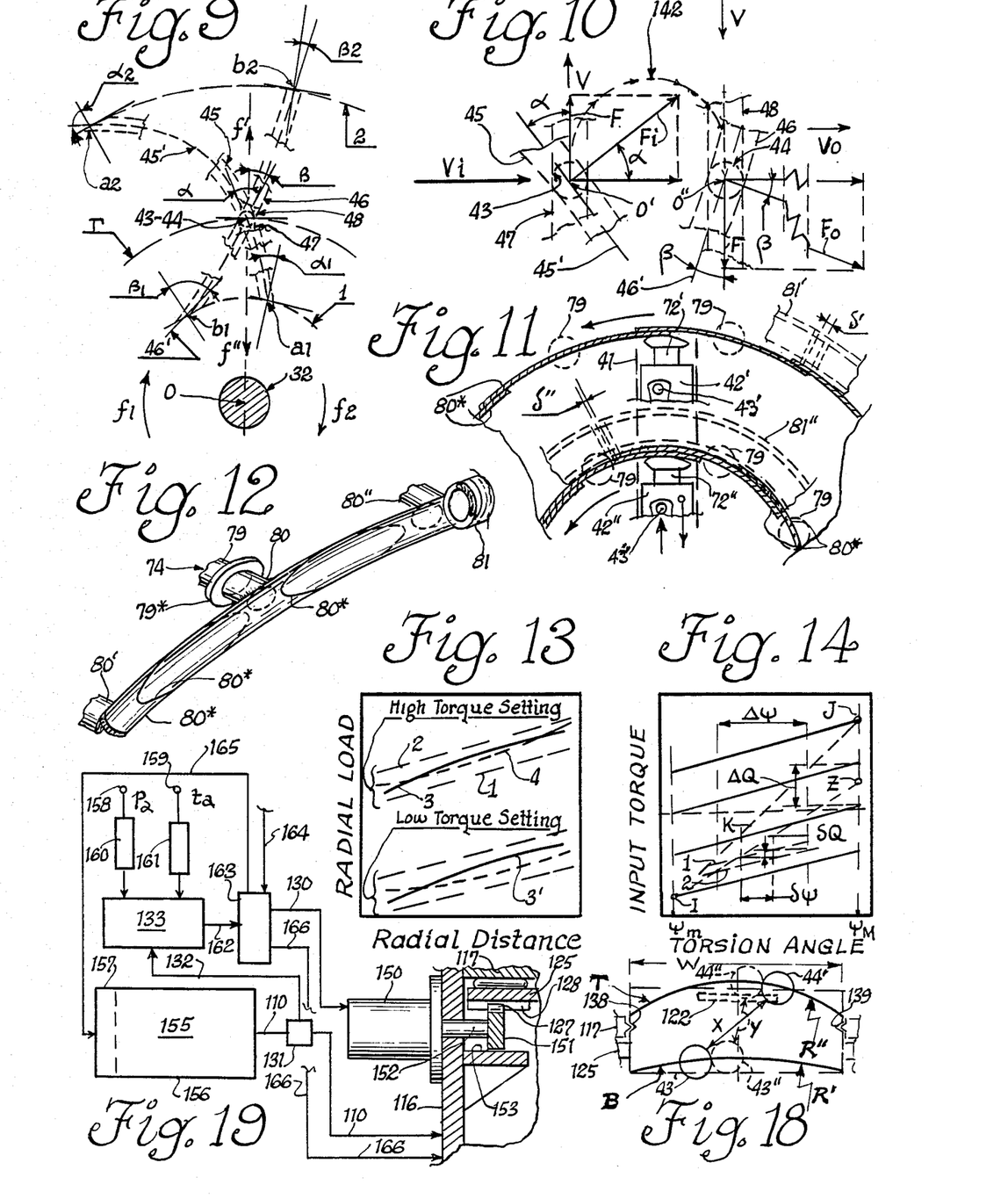
FIG. 9 is a schematic diagram depicting a set of two conjugate cooperating grooves in an idealized planar configuration.
FIG. 10 is a diagram showing the forces acting and directions of displacements imposed on two sets of conjugate and cooperating straight and spirally-laid grooves by the ball that they constrain.
FIG. 11 is a partial sectional schematic of the speed ratio adjustment system shown in FIG. 3.
FIG. 12 is a partial perspective view of the actuation mechanism of the speed ratio adjustment system shown in FIG. 3 and 11.
FIG. 13 is a graphic representation of the radial loads exerted on segment structures as a function of radial distance for two typical torque level control adjustments.
FIG. 14 is a graphic representation of the variation of input torque resulting from variations in output torque requirements as provided by typical torque control systems having variable spring loading, such as provided by a torsion sleeve, between input and output shafts.
FIG. 18 is an external end view of a segment structure used in conjunction with a conical configuration of the invention embodiment.
FIG. 19 is a combination of block diagram and schematic of a typical control system used for the coupling of the IV drive of the present invention with a vehicle powered by an internal combustion engine.

The diagrams of FIG. 9 and 10 describe the configurations of the spiral grooves, the various angles of interest to the operation of the drive, the forces exerted by or applied on the groove walls and the balls, and their directions. Their significances in relation to the drive operation and performance are explained and discussed in the following section.

The partial schematic of FIG. 11 depicts the interaction between curved foil wings 80* and stems 72 of segments 42, and the operation thereof; a prime index on the reference numbers indicates an outwardly extended position of the segments and a double prime index indicates an inwardly retracted position of these segments. Spaces $\delta'$ and $\delta''$ indicate the length variation of spring 81 between these two positions. Foil wings 80* overlap so as to form a continuous extensible structure having a double curvature so as to keep spring 81 nestled in and at the same time provide a certain amount of flexural rigidity. Retaining flanges such as 79* on both sides of portions 79, and in between, serve to guide pin 74 and to keep it from tilting.

The curves of the graphs of FIG. 13 and 14 pertain to the operation of the drive torque control system. Their meaning and interpretation are explained and discussed in the following section.

Figure 15:
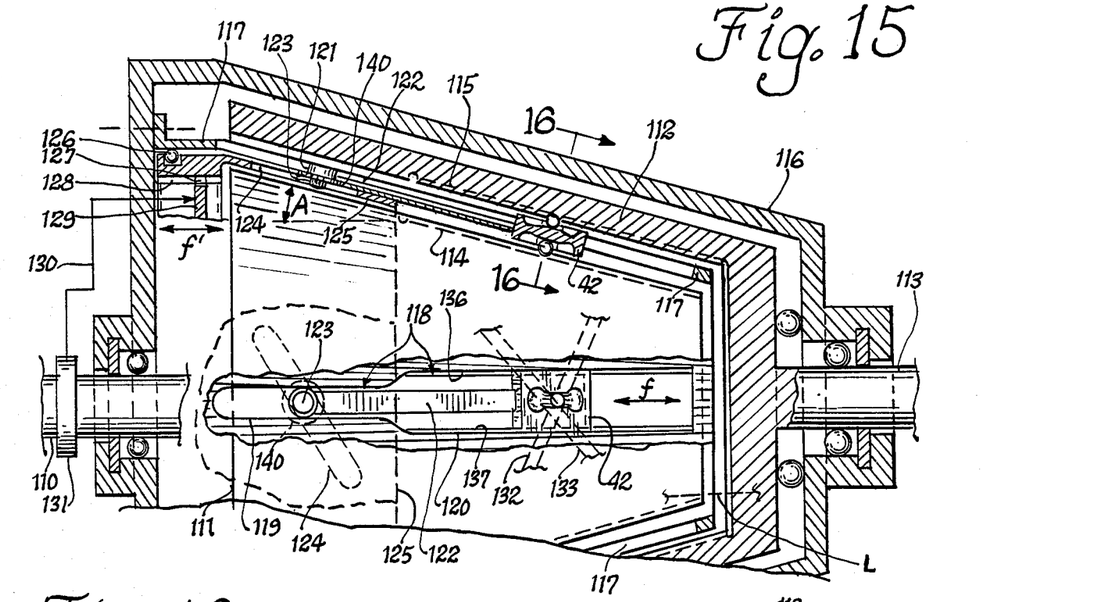
FIG. 15 is a partial elevation cross-sectional view of a conical configuration of an embodiment of the invention.

Referring to FIG. 15, another configuration embodiment of the invention more applicable to automotive applications is presented in a partial sectional view. It represents a more general configuration in which the balls move along conical surfaces, of which a plane is a particular form, the cone half angle A beng then $\pi/2$. A cylindrical surface would also be a particular form of a conical surface for which $A=0$, which is the case of the invention described in U.S. Pat. No. 4,739,668. The major difference though resides in a generic feature that characterizes the ball-linked chain and the manner in which it is constrained. In the cited reference all elementary ball chains are connected so as to form a continuous multi-looped single chain. This allows the use of one single monolithic sleeve structure for channeling the chain. In the present invention, the sleeve must be broken into separate segments in a way such that each elementary ball chain must be contained in one segment and form a closed loop within a self-contained endless channel. Lateral distances between segment structures must be allowed to adjust to the varying mean diameter between the two circles passing through the centers of the balls in contact with both helical and straight grooves, while such contact points move linearly back and forth. This explains why all segments must be actuated synchronously so that all ball contact points constantly remain on one single circle and in one single plane orthogonal to the drive axis of symmetry.

In the conical configuration of the invention embodiment presented in FIG. 15, all the basic components described in the case of the planar configuration are still present. The segment structures and their associated balls are easily recognizable and are not described here. Input shaft 110 connected to central conical body 111 provides the driving torque. The torque is transmitted by the balls of a plurality of segments 42 to conical shell 112 connected to output shaft 113. Corresponding helical grooves 114 and 115 in cooperation with the straight grooves of segments 42 provide the torque transmission discussed in the cited reference. The drive is supported by and contained within external housing 116 that supports the two shafts. A conical sleeve 117 affixed to housing 116 and located between central body 111 and shell 112 is provided with elongated longitudinally-oriented slots 118. Slots 118 consist of two portions 119 and 120, each having a distinct role. Portion 119 guides follower 121 attached to the end of stem 122, while portions 120 guide segments 42. The direction of segment 42 paths intersects the drive axis of symmetry at a common location, the apex of the conical surface along which the segments travel. Stems 122 are mounted on segments 42 and are also equipped with rollers 123 that engage slots 124 cut in rotatable sleeve 125 and are oriented helically therein. A relative angular displacement between fixed sleeve 117 and rotatable sleeve 125 causes segments 42 to move synchronously along portions 120 of slots 118 in a manner similar to that described in the case of FIG. 7 and as indicated by arrow f.

Rotatable sleeve 125 is maintained concentric with sleeve 117 by means of bearing 126 and is actuated by means of fingers 127 that engage helical grooves 128 cut on the inner face of sleeve 125 annular body. A displacement of ring 129 to which fingers 127 are affixed in the direction of arrow f' thus causes a rotation of sleeve 125 with respect to fixed sleeve 117. Ring 129 axial position is set by an actuating mechanism not shown, as it is well known in the art, but represented by signal line 130 that is connected to torque sensor 131 shown schematically mounted on input shaft 110. Two corresponding helically-oriented grooves 132 and 133 on body 111 and shell 112 define both the relative rotation direction of shafts 110 and 113, and the ratio between the absolute rotational speeds of the two shafts.

Figures 16, 17:
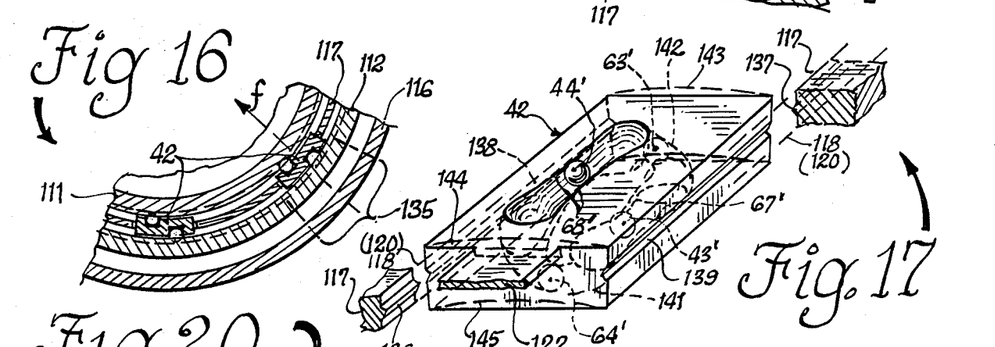
FIG. 16 is a partial transversal cross-sectional view of the conically configured embodiment of the invention taken along section line 16—16 of FIG. 15.
FIG. 17 is an external perspective view of a sliding segment structure for channeling the chain of balls that provide the mechanical positive connection between the input and output shafts.

FIG. 16 presents a partial cross-section of the assembly of segment 42 structures, fixed sleeve 117, central body 111, shell 112 and housing 116. A local external view of one slot 118 and of a segment 42 therein as shown in FIG. 15 corresponds to portion 135 of housing 116 and of shell 112 being removed, as indicated schematically in FIG. 16.

Segment 42 structure is shown in perspective in FIG. 17 where small portions of fixed sleeve 117 are depicted so as to illustrate the contour of slots 118 (120) in phantom lines. So as to maintain segment 42 centered between the inner surface of shell 112 and the outer surface of central body 111, and to prevent it from tilting about its ideal centered position, two sets of tongue-in-groove arrangements are used as shown in details in FIG. 17. Ridges 136 and 1317 extend the full length of portion 120 of slot 118 and slidingly engage cooperating V-shaped grooves 138 and 139 respectively, and cut on the sides of segment 42 structure. In addition to those guiding features, a flange 140 located between and separating follower 121 and roller 123 is positioned between the inner surface of fixed sleeve 117 and the outer surface of rotatable sleeve 125. This flange feature is shown in FIG. 15 but omitted in FIG. 17, where stem 122 is cut short.

In order to minimize the thickness of segments 42, balls 43' and 44' in straight grooves 67' and 68' are not exactly located in line from the drive symmetry axis but slightly offset as shown in FIG. 17. Tha ball-offset feature is also apparent in FIG. 8 where straight grooves 47 and 48 are off-centered with respect to segment 42 axis of symmetry, and in FIG. 16 where it is even more pronounced. This offsetting feature is also needed to facilitate the channeling of the balls inside segment 42 structure. Four balls are shown in FIG. 17 positioned in four typical positions, two fully engaged in straight grooves and one at each end of loop bends 141 and 142. It is understood that the closed-loop channel is filled with adjacent balls in constant point contact as described and for the reasons discussed in the cited reference.

Segments 42 used in planar-configuration embodiments have flat faces and thus straight edges. Segments 42 used in conically configured embodiments should have some curved faces as outlined in phantom lines 143, 144 and 145 in FIG. 17. This is better shown in FIG. 18 that depicts an end view of a typical segment 42 structure ideally shaped to conform to the variations of curvatures of both the inner conical surface of shell 112 and the outer conical surface of central body 111. In FIG. 18, the rectangular contour shown in phantom lines corresponds to a segment used in a planar configuration, whereas the contour shown in solid lines, two curved lines (top and bottom) and two straight lines, corresponds to the conical configuration. In both cases, the segment width is W and its thickness is to be minimum. Increasing W obviously enables distance Y to increase to distance X, while the segment thickness could be decreased further without appreciably affecting X.

In all instances, the segment edges must interfere with neither shell 112 inner grooved surface nor body 111 outer grooved surface. Thus curve T must accommodate the smallest radius of curvature of shell 112 and curve B must accommodate the largest radius of curvature of central body 111, the latter happening to be generally much larger than the former. Further, the height of the segment sides must be large enough to accommodate both guiding grooves 138 and 138, and the minimum thickness that fixed sleeve 117 must have to insure its rigidity. These conditions establish practical limits within which the conically configured embodiment of the invention must remain. Such limits concern cone angle, segment 42 axial travel and resulting drive speed ratios, for set limit values of helix pitch angles of the grooves. A detailed discussion of the latter is presented in the cited reference for a cylindrical drive system, but it also applies to a conical drive configuration as well. The case of the spiral grooves of a planar configuration is discussed in the following section.

FIG. 19 presents a simplified block diagram that indicates how the operation of the conical drive described in FIG. 15 to 18 may be coupled with the operation of the engine of a vehicle in automotive applications. A thorough discussion of the general subject is presented in another U.S. Patent of the author U.S. Pat. No. (4,747,269) entitled VARIABLE SPEED POWER-TRANSMISSION SYSTEM in which a hydraulic IV automatic transmission is coupled to a motorized vehicle. The coupling principles and advantages are reached by means that are summarized in FIG. 19 and thus are not repeated in detail herein. A state-of-the-art actuation mechanism, as previously alluded to, is schematically represented by linear actuator 150 for positioning element 151 equipped with fingers 127 engaging helical grooves 128 and actuated by stem 152 while guided by support 153.

The engine assembly 155 consists of the motor 156 and its fuel system 157. Engine power is provided by shaft 110 equipped with torque level sensor 131. The value of the torque level is sent by signal line 132 to torque monitor 133 where it is processed and compared to the optimum torque level that the engine should produce based on ambient air conditions characterized by pressure $p_a$ and temperature $t_a$, measured by sensors 158 and 159, and processed by transducers 160 and 161, respectively. Signal line 162 carries the torque input signal $Qi^*$ to computer 163 where it is further processed and compared to that which an input signal value sent by signal line 164 demands. To satisfy such demand, computer 163 sends two signals, one to the fuel system by means of signal line 165 and the other to actuator 150 by means of signal line 130 for setting the speed ratio that the drive must maintain so as to insure that the demand sent by signal line 164 is met.

The type of signal carried by line 164 could be: (1) vehicle velocity, (2) engine speed (rpm), (3) engine torque, (4) a driver manual input, and (5) any combination thereof. This aspect of engine/vehicle control is extensively described and discussed in U.S. Pat. No. 4,747,269. The processing of such signals is also treated in that reference. The end result is to take advantage of the IV feature to minimize the fuel consumption under such vehicle operating conditions as: (1) constant vehicle velocity, (2) minimum specific fuel consumption by the engine, (3) optimum vehicle acceleration, or (4) engine maximum torque. The vehicle driver selects the engine/vehicle operational mode desired and the speed ratio yielded by the IV drive then is automatically adjusted so as that the engine operation requirements are also automatically met.

If the driver wishes to switch to manual control, computer 163 sends a signal by means of signal line 166 so that the driver may set values for the engine/vehicle operational parameters that he may control from observing indications given by the dashboard instruments that he then monitors himself. In such instance, the torque level transmitted, hence exerted by the engine, may be set at a nominal level as is done with FIG. 4 adjustment system. The torque level imposed on the transmission axle (or shaft) of the vehicle by the vehicle operating conditions, e.g. road grade, hence on conical shell 112, causes the speed ratio to adjust automatically so that the amount of torque demanded of the engine remains about equal to the set nominal level.

Figure 20:
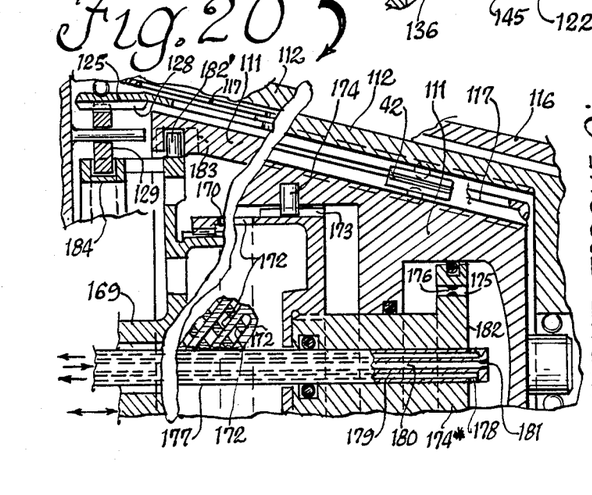
FIG. 20 is a partial cross-sectional view of a conical configuration embodiment of the invention in which the actuation system of the torque control mechanism in housed in the central body into which the engine torque is inputed.

Such an adjustment of the nominal level, while the engine and vehicle are operating, can be achieved by means of the hydraulic system shown in FIG. 20. Readers versed in the art will understand that other means such as those provided by an electric or mechanical system could just as easily be used without departing from the scope and spirit of the present invention. FIG. 20 drawing represents only an examplary embodiment of such manual engine torque level adjustment. To that effect, both the torque sensor and the torque level adjustment are contained within central body 111 and the end of signal line 166 is contained inside input shaft 110, not shown here, but connected by straight splines to actuating flange 169 that is free to axially slide and to transmit the input torque, as described below.

The input torque sensing unit is torsion sleeve 170 connected at one end by straight splines 171 to flange 169 and provided also with a plurality of helical slots 172. The other end of sleeve 170 is equipped with helical splines 173 for engagement by a plurality of stubs 174 affixed to body 111. The axial motion of sleeve 170 is provided by hydraulic piston 174* equipped with hole 175 in which restricting orifice 176 is inserted for providing a dampening effect on the sliding motion of sleeve 170. An axially slidable twoway duct 177 for bringing pressurized hydraulic fluid is equipped with holes 178 near its tip. The fluid is brought in by central pipe 180 and returns through annular pipe 179. The end of pipe 180 is equipped with a restricting orifice 181 so that the partial covering of holes 178 by the right face 182 of piston 174* cooperates with orifice 181 to form a positioning/follower arrangement as is well known in the art, whereby a set position of piston 174*, hence of sleeve 170, is defined for each set position of duct 177.

As a result thereof, readers will understand that a set amount of torsional deformation, hence of torque, is applied between the two ends of sleeve 170. An increment to such set amount of torque can only be generated if one end if further caused or allowed to rotate with respect to the other. This occurs when body 111 rotates with respect to flange 169; such differential amount of rotation is transformed into axial displacements of flange 170 by the cooperation of a plurality of stubs 182′ that engage a corresponding plurality of helical grooves 183 cut into the inner surface of body 111. A plurality of forks 194 mounted on flange 169 engage ring 129 that in turn engages helical grooves 128 of rotatable sleeve 125, a description and the operation of which have previously been given. Helical grooves 183 have a limited length such that stubs 182′ are limited in their angular travels, at both ends of which the stubs come into contact with the ends of their corresponding helical grooves. It is understood that the amount of travel and the limits thereof of all adjustably moving parts are dimensioned to correspond and coincide, while the whole drive assembly continuously rotates.

Simply put, a given axial position of duct 177 imposes a given position of piston 174*, hence a given axial position of sleeve 170, hence a given minimum value of the nominal selected torque to be exerted between grooves 173 and splines 171, while stubs 182 and ring 129 are positioned at one limit of their travels. With duct 177 remaining fixed, an increase in the output torque causes an increase of the amount of torque transmitted by sleeve 170 and an angular displacement of flange 169 with respect to body 111, whih in turn causes flange 169 to move axially, which in turn causes ring 129 to move axially, which in turn causes sleeve 125 to rotate with respect to sleeve 117, and which in turn causes segments 42 to adjust so as to decrease the amount of input torque demanded of shaft 110 by adjusting the drive speed ratio. A reverse process occurs when the output torque decreases, in which case, the speed ratio is adjusted in the opposite direction so as to increase the amount of input torque. The amount of input torque then varies as shown by the graphs of FIG. 14 in which each straight line corresponds to a set nominal torque, while the ends of each line segments correspond to the physical limits mentioned above. For practical reasons, it is advantageous to insure that the drive operates mostly between such limits or in the central region of the graphs as indicated in FIG. 14.

Figure 21:
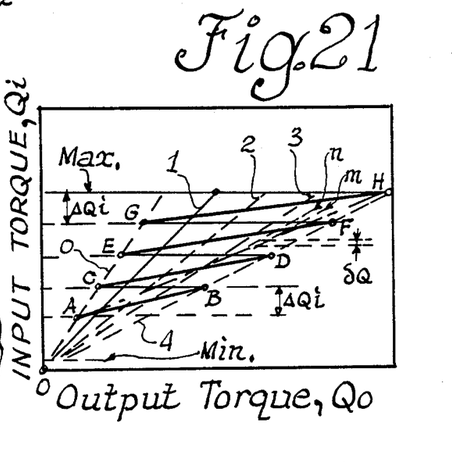
FIG. 21 is a graphic representation of the input torque variations as a function of output torque variations for different typical settings at which the input torque is to be regulated, as the output torque demand varies.

The variations of input torque required of shaft 110 to satisfy the output torque requirements imposed on shaft 113 by means of shell 112 as the drive rotates, are indicated in the graphs of FIG. 21. The converging straight lines correspond to four different positions of piston 174* of FIG. 20 and to four nominal levels of input torque at which the input torque is to be held. The solid line corresponds to a reference setting for which the speed ratio is 1/1. The dash line on the left side of line 1 corresponds to what is referred to as overdrive. The three dash lines on the right side of the solid line correspond to speed ratios below 1/1.

These variations of Qi (input torque or engine torque) and of Qo (output torque or transmission-shaft torque) in an automatic control mode can occur in two major ways or in an infinite number of combinations thereof, depending on the control system used. If the position of piston 174* is held fixed at a low value of Qi (point A), the ratio between Qi and Qo varies from point A on line 0 to point B (maximum of Qo obtainable at a low value of Qi) on line 4 along linear segment A–B that has a much less steep slope than that of line 4. Segment A–B slope is determined by the torsional flexibility of sleeve 170 combined with the relationship between segment 42 travels and the angular displacements of sleeve 170 left end. At or near point B, flange 182, sleeve 125 and segment 42 are all close to the limits of their allowable displacements, and piston 174* axial position must be adjusted so that point B can be brought back to point C on line 0. The same process is repeated if the Qo value demanded is further increased, i.e. from point C to point D, in which case, the setting of Qi must be increased, e.g. by increasing the fuel supply or by exerting a greater effort on the bicycle pedals.

The adjustment of the axial position of piston 174* can be imposed manually by the driver, as is done with gearboxes with manual stick shifts, or automatically by the torque control system shown in FIG. 20. In the first instance, Qi is not exactly held at a set value, but is allowed at each Qi setting to creep up or down along segments such A–B, C–D, E–F and G–H for each fixed position of piston 174*. Segments B-C, D-E and F-G correspond to adjustments in axial position of piston 174*. In the second instance, the Qi control-system adjusts the axial position of piston 174* whenever a variation $\Delta Q_i$ of Qi exceeds a value $\delta Q_i^*$ much smaller than $\Delta Q_i$ of FIG. 21. In which case, the drive operates in a similar manner but in which lines 0 and 4 represent limits on either side of segment A-H that represents then a locus of piston 174* nominal position settings, as discussed in the following section.

OPERATION AND DISCUSSION:

As mentioned in the preceding section, the infinitely variable (IV) feature of speed ratio adjustment provided by the present invention system mandates that the pitch angle of the helical grooves of at least one of the facing surface vary lengthwise along the grooves. Such requirements are discussed in detail in my U.S. Pat. No. 4,739,668 and need not be repeated here in the case of a conical configuration, for which only the influence of the cone angle on the speed ratio is analyzed. However, in the case of a planar configuration in which spirally-laid grooves are used, a full discussion is in order. The influence of the number of balls per chain and of the number of chains or segments is also different in the present invention and justifies discussion. The control of the position of individual segments and the synchronicity of their displacements need discussing. The design aspects of the drive that differ also require further discussion. Other design aspects such as those of the straight groove ends and ball channels, the spiral/-helical groove dimensioning and interfering, and the influence of such interference on either the planeness or the conicalness of the grooved facing surfaces need no discussion as readers may refer to U.S. Pat. No. 4,739,668 for such information.

Speed Ratio Determination (Spiral Grooves)

Because a maximum range of variations of speed ratio for a given degree of groove self-interference or a minimum degree of groove self-interference is also desirable for a given range of speed ratio, only design cases in which the groove pitch angles on both facing surfaces vary concomitantly and in opposite direction are analyzed here. The planar configuration in which grooves are spirally-laid is graphically represented in FIG. 9 and 10 in a manner such that the input and output shafts are caused to rotate in the same direction. The drive parameters not readily identified in FIG. 9 and 10 are listed below for easy reference:

input shaft angular velocity or speed $\omega_i$,
output shaft angular velocity or speed $\omega_o$,
torque applied on the input shaft Qi,
torque transmitted by the output shaft Qo,
sum total of the forces applied on the balls by the grooves of the input flange Fi
sum total of the forces exerted by the balls on the grooves of the output flange Fo
radius of circle $\Gamma$ on which all groove/ball contact points are located at any given time R Several conditions must concurrently be satisfied to enable the drive to operate satisfactorily. A first condition is that no area of the "imaginary" facing grooved surfaces of the flanges is present, which would cause ball jamming or binding. A second condition of a practical nature requires that all sprial grooves are used equally so as to even out the resulting groove surface wear. A third condition is that at least three angularly-spaced balls be continuously quasi equally distributed along circle $\Gamma$ and also fully engaged so as to insure a centered axial reaction on both flanges. Finally, it is assumed that the two circles $\Gamma$, one pertaining to each flange, have equal means radii at all times, which means that all balls move radially in the straight grooves at the same velocity V, but in inverse direction.

This means that, in FIG. 9 and 10, if axle 32 and spiral groove 45 (centerline 45') rotate in direction f1, ball 43 restrained by straight groove 47 must move radially outwardly in direction f'. Its counterpart ball 44 then is forced to move radially inwardly along arrow f" direction in straight groove 48, which imposes a rotation on spiral groove 36 (centerline 46') in arrow f2 direction, the same as that of f1. Centerlines 45' and 46' of two associated spiral grooves intersect at point 0, and balls 43 and 44 occupy the same theoretical place (43-44) as projected in FIG. 9 plane. In FIG. 10, for ease of representation and sake of clarity, balls 43 and 44 are shown separated but connected by portion 142 of the ball chain. Point 0 becomes 0' and 0", and balls 43 and 44 move in cooperating grooves 45-47 and 46-48, respectively.

In FIG. 9 and 10, the angles made between the spiral centerlines and their associated radial directions are $\alpha$ for the input flange and $\beta$ for the output flange, at circle $\Gamma$ location. The limit values on circles 1 and 2 of $\alpha$ and $\beta$ are respectively $\alpha1$ and $\alpha2$, and $\beta1$ and $\beta2$. Force F transmitted by the balls in their forced displacements along the ball chains is the same for balls 43 and 44, as is their velocity V. Also $Vi=\omega i.R$ and $Vo=\omega o.R$ which means that $Vo/Vi=\omega o/\omega i$, since R is the same for both input and output sides. From the assumptions and the operating conditions previously stated, it follows that $\omega o/\omega i=\tan\beta/\tan\alpha$ and is equal to r, r being the drive speed ratio.

Speed Ratio Determination (Conical-Helical Grooves)

In the case of the conical drive configuration, assuming the helic pitch angles defined in the first reference cited and neglecting second order corrections stemming from the influence of the cone angle (half-angle A of FIG. 15). For a cylindrical configuration, r is equal to $\omega o/\omega i=(Ri/Ro).(\tan\theta i/\tan\theta o)$ if Ri and Ro are the radii of the circular paths followed by the balls applying the input torque and transmitting the output torque, respectively, for any given axial position of segments 42, using the equation derived in U.S. Pat. No. 4,739,668. However, both Ri and Ro vary with the axial travel of segments 42, as the speed ratio of the drive varies. Such variation amounts are equal to $\lambda.\tan A$, where $\lambda$ is the segment travel. Neglecting the influence of segment 42 thickness or assuming that (Ro-Ri)/Ri is very small, as a first approximation one may assume in turn that Ri/Ro is close and remains close to 1, regardless of the value of $\lambda$, or of the speed ratio. In conclusion, again as a rough approximation one can realistically assume that the speed ratio of a conical IV drive can be roughly expressed as $\omega o/\omega i=\tan\theta i/\tan\theta o$. At this juncture, readers should be aware that angles $\alpha$ and $\beta$, and $\theta i$ and $\theta o$ respectively are not defined in similar manners. $\alpha$ and $\beta$ are angles between radial directions and tangents to groove centerlines at the ball contact points, whereas $\theta i$ and $\theta o$ are angles between tangents to circles like $\Gamma$ at their ball contact points and tangents to the groove centerlines at the ball contact points. Using of one system of reference or the other is only a matter of choice, or of preference.

Drive Performance Limitations

As thoroughly anlalyzed in the first reference cited, practical reasons dictate that the ranges of the variations of $\alpha$ and $\beta$ (or for that matter $\theta i$ and $\theta o$) remain within 35-40 degrees, between their limit values. The combination of decreasing angle values of one family of grooves, e.g. input side, with increasing angle values of the other family of grooves, e.g. output side, provides a total variation range of speed ratio r of up to 10/1. Such a range is more than adequate for bicycle and automobile applications. FIG. 9 graphic representation gives a realistic view of both proportions and angle variations that may be considered in the case of planar configurations featuring spiral grooves. In the case of helical grooves used in a conical configuration, readers can refer to my U.S. Pat. No. 4,739,668 for further discussion.

In the planar configuration (spiral grooves), each ball constrained between straight and spiral grooves acts as a wedge, and the two thus-constrained balls of each segment tend to push the two flanges apart. Flat flanges cannot be reinforced sufficiently to maintain their deformations below an acceptable level. Provisions can be made to support the flanges on their outer faces as shown in FIG. 7 in which two flat thrust bearings 101 and 102 are used to transfer such transversal loading of the flanges to drive casing 38. Such load transfer mechanism could greatly alleviate the consequences that flange deformation might have on the performance limitations that it would otherwise impose on the drive. In the cases of cylindrical and conical drives, such loads are reacted by means of hoop-stressing circular structures that can much more effectively handle such type of loading.

Number of Ball-Chains and Number of Balls per Chain

In the present invention, no correlation exists between the position of the balls in a segment ball-chain and the position of the balls in any one of the other segment ball-chains. Although the ball-engagement length of the straight grooves is equal to at least one ball diameter, it is preferable to insure that all engaged balls can neither become engaged nor become disengaged simultaneously. The preferred way to insure that such condition can never materialize is to use a number of segments that is a multiple of 3 and to use a number of balls in each segment of a group of 3 that varies by one ball. Also, to insure that at least three ball/groove contact ports are equally angularly distributed about circle $\Gamma$ of FIG. 9, the number of segment groups should be a multiple of 3 also.

The smallest number of segments is then 9, i.e. three groups of three chains in which the number of balls varies by one ball from one chain to the consecutive chain and then by two balls in consecutive chains for adjacent groups. The number of balls per chain could be for instance 7, 8 and 9, as a lower limit, and up to 11, 12 and 13, as an upper limit. These two arbitrary limits result from considerations of ease of ball channelling between straight grooves and of segment structure total lengths that should remain as short as possible. This is especially true in the case of planar configurations of the drive. As an example, adjacent segments in one group could have: seven balls in one segment, eight balls in the next, then nine balls in the third segment. Such distribution can then be repeated three times in the same sequence and in the same order of increasing or decreasing numbers.

Drive Operation Control

Planar Configuration Embodiment:

For ease of distribution and identification, bicycle application only is discussed as drive control example. The figures directly applicable are: FIGS. 1, 3, 5, 7, 8, 11 and 12. FIGS. 13, 14, 17 and 21 are of interest here too, but mostly apply to the conical configuration that would generally pertain to automotive vehicles. The speed ratio adjustment can be fully manual as it is with derailleurs but the subject drive adjusts such speed ratio smoothly and in an infintely variable manner. The torque thus is not controlled but results from speed ratio selection. This drive is illustrated in FIG. 1, 7 and 8 in particular. The rider provides the feedback loop and adjusts the torque by means of speed ratio adjustments that are fully described in the previous section.

In FIG. 3, 11 and 12, mechanisms are shown for setting a torque level and for self-regulating that torque about the set level. When using a bicycle, a rider should have the possibility to adjust the amount of effort he (she) is prepared to exert on the pedals. This amount of torque level varies both from rider to rider and according to the physical conditions in which any given rider may be at a certain time. Thus, it seems advantageous to equip a bicycle with a drive offering such flexibility.

In all instances, the spiral grooves can be laid on the flanges in such a manner that the speed ratio ($\omega o/\omega i = r$) yielded by the drive decreases as segments 42 move radially outwardly, while the radial component (RADIAL LOAD) of the resultant of forces Fi and Fo, or (Fi, Fo), of FIG. 10 exerted outwardly on segments 42 grows larger as the segments move outwardly (Radial Distance). Typical segment responses are graphically shown by the curves of FIG. 13 graphs. They apply to the torque level control depicted in FIG. 3, 11 and 12. Two sets of corresponding curves are shown, each set pertaining to one torque level adjustment by means of the tension set on spring 73. One set is referred to as Low Torque Setting and the other is labelled High Torque Setting. If the tension of spring 73 is adjustable by set steps, one set of curves corresponds to each adjustment step. the curves of FIG. 21 would correspond to five steps. In FIG. 13, each set of curves exhibits four curves, 1 and 2 in dash lines indicate the lower and upper limits imposed by a given spring setting, curve 3 in solid line corresponds to a possible arrangement or combination of the spiral groove layouts, curve 4 in dotted line corresponds to another possible layout. In both cases, the curves must display a monotonic increase of RADIAL LOAD as a function of increasing Radial Distance. Curve 3 of FIG. 13 would be associated with line segment G–H of FIG. 21, whereas curve 3' would be associated with line segment A–B, respectively.

It should be understood that the speed ratio corresponding to drive operations at points A or G are the same and that the speed ratio corresponding to drive operations at points B or H are the same also, but represent the other extreme of the speed ratio variation range. Therefore, the automatic torque control being discussed here in the case of bicycle applications does not provide the operation possibility represented by line segment A–H in which both torque level adjustment and torque level control are caused to happen simultaneously. The additional mechanical complexity needed for enabling the adjustment of spring 73 while a bicycle is in operation does not seem justified. However, it should be mentioned that such possibility is provided by the embodiment construction shown in FIG. 3. Although the embodiment shown in FIGS. 4 and 6 pertains to the planar configuration type, it would be applicable to automotive uses and it is briefly discussed in the sub-section below.

Although the details of spring 73 adjustable attachment to either flane 76 or flange 70 are not shown in FIG. 3, readers familiar with the art will understand that one end of spring 73 can be fixedly attached to flange 76 that also supports the spring body, whereas the other end of spring 73 may be snapped onto one of a series of hooks mounted on the periphery of rotatable flange 70. Access to such adjustment can be provided by means of an opening in casing 38 equipped with a removable cap and located to be positionable in line with one of the hooks. Also, holes could be used instead of hooks so that spring 73 hook-shaped adjustable end can be inserted in any one of such adjustment holes. Hooks (or holes) thus enable the setting of set torque levels as earlier mentioned. Conical Configuration Embodiment:

The figures directly applicable here are: FIGS. 14, 15, 16, 18, 19, 20 and 21. Indirectly, FIGS. 4, 6, 13 and 17 apply to and contain features relevant to automotive uses for which conical configuration embodiments seen to be of most value. In all instances, for practical reasons, the controlled torque is measured or detected by means of a torsion sleeve. The sleeve both transmits the input torque and torsionally deforms concomitantly, the amount of such deformation being a measure of the torque being transmitted. A plurality of helically-shaped slots 172 as shown in FIG. 20 provide both the axial and torsional flexibilities required to generate both axial and angular displacements large enough to actuate sleeve 125 and create sizable sliding displacements of segments 42. Torsion sleeve 87 of FIG. 4 is similarly constructed and used.

In drive embodiments for automotive use, the torque level adjustment can be manual (case of FIG. 4) or automatic (case of FIG. 19). In the case of FIG. 20 construction, the axial location of positioning duct 177 could result from the direct action of the driver (manual) or of the torque control system shown in FIG. 19. For the sake of simplification, it is assumed that FIG. 20 embodiment configuration is of a fully automatic control type, according to the operation mode typified by segment A-H of FIG. 21 graphs as earlier discussed. It should be mentioned here that segments 42 are positively actuated in both directions, in all cases. This is not true for the embodiment shown in FIG. 3, 11 and 12 for bicycle applications in which tension spring 81 looped around a number of overlapping spring foils 80 provides the inwardly-directed return of segments 42 by reacting against the outwardly-directed radial components of (Fi, Fo) combined. The radially-directed component of the hoop compression on spring foils 80 produced by spring 81 tension is always smaller than the (Fi, Fo) radial component, though it somewhat affects its value continuously. Such is not the case in the drive embodiments equipped with torsion sleeves.

In both cases of automotive applications, manual and automatic, it should be remembered that the torque level, once set, is automatically controlled about that set level value, as described earlier for FIG. 21 graphs. Thus, in both cases, levels of input torque to be controlled may be typically depicted by a family of straight lines in FIG. 14 graphs. The relative angular displacements between both ends of the torsion sleeve is ($\Psi M-\Psi m$) and roughly equal (though shown slightly larger on the graphs) to the sleeve torsion increment needed to yield the torque increment $\Delta Q$ earlier defined, in the case of a manual adjustment. A practical range of torsion increment could be $\Delta \Psi$, yielding a smaller value of $\Delta Q$ as shown and the possibility of a larger number of adjustment steps. In the case of a fully automatic control drive, i.e. segment A-H of FIG. 21 case, a much larger number of increments such as $\delta Q$ and corresponding $\delta \Psi$ represents the drive operation as typically depicted by two dotted lines 1 and 2 of FIG. 14. A correspondence between the lines of FIG. 21 graphs and those of FIG. 14 graphs is now established.

Each straight line of FIG. 14 and 21 corresponds to the equivalent of stick-shift gearbox characteristics representing speed (or gear) ratio settings, four for FIG. 14 and five for FIG. 21. Each line also corresponds to one of the manual settings. As earlier mentioned, a much larger number of settings with much smaller torque level incremental steps $\delta Q$ represents the operation of the fully automatic control drive. Dotted lines 1 and 2 of FIG. 14 can be represented by dotted lines n and m of FIG. 21 graphs, and the incremental step $\Delta Q$ of the input torque along segment A-H corresponds to $\Delta Q$ step of FIG. 14. The values $\Delta Q$ and the selection between the straight line torque characteristics is made by the driver in a manual system. The selection of $\Delta Q$ increments and of the torque level to be regulated is made by the engine control system in the case of the fully automatic system. Such an engine control system is shown in FIG. 20 and was described in the previous section. Typical engine and vehicle characteristics such as torque, rpm or rotational speed, shaft power, specific fuel consumption, vehicle speed and transmission speed (or gear) ratios, and their relationships are well known and understood in the art. Their significance and application to the automatic control of typical automotive power transmissions are described and discussed in my U.S. Pat. No. 4,747,269, and graphically presented in form of curves in FIGS. 18-20 thereof. Thus, this needs not be repeated here.

Whichever mode of vehicle operation is sought, the end result comes down to the control of engine power level. It is best and most simply expressed by the product of engine rpm and torque. One type of engine control of most interest in terms of fuel saving is that which insures that the engine regime is kept at an operation point where specific fuel consumption is minimum, but not necessarily at a fixed engine rpm or at an engine rpm where the torque developed on the engine shaft is maximum as a function of rpm for a given engine power setting, e.g. a gas pedal position. Computer 163 of FIG. 19 determines the value of $Qi^*$, or torque setting, that will satisfy the engine operational requirements imposed by the vehicle operation mode and the corresponding fixed value of the operational parameter being controlled, such as vehicle velocity, that defines such mode, e.g. constant vehicle cruising velocity at the minimum specific fuel consumption condition of the engine.

Depending on ambient conditions (pa, ta) and engine power level demand from either the driver or the vehicle operational mode control system, the value $Qi^*$ determines a set axial position of duct 177, hence a set torsion torque in sleeve 170 for any given axial position of flange 169 (FIG. 20) and hence for any given ratio of either speed or torque. Vice versa, the speed ratio will adjust whenever the value of $Qi^*$ is affected by a change in the value of Qo that must remain free to vary so as to enable the vehicle controlled parameter, e.g. vehicle speed, to keep its set value. When Qo varies, for any given value of speed ratio or position of rotatable sleeve 125 then existing at that time, the input torque demanded varies concomitantly and then differs from Qi*. This difference $\delta Qi^*$ causes a small rotation of flange 169 and a readjustment of the position of sleeve 125, hence of the speed ratio, so that Qi is brought back close to the controlled value Qi*. However, there remains a differential $\delta Qi$ that is caused by and results from the slope $\delta Q/\delta \Psi$ that characterizes the torsional springiness of torsion sleeve 170. This effect is equivalent to the droop of a proportional speed regulator usually characterized by a droop rate, determining its precision and influencing its stability.

If torsional adjustment of the right end of sleeve 170 were not available, the relationship between input torque Qi and torsion angle $\Psi$ in FIG. 14 would be represented by straight line K between points I (minimum torque setting) and J (maximum torque setting). Such characteristics would correspond to much higher values of $\delta Q/\delta \Psi$, hence to a less precise but more stable regulating system. Also, the full range of speed ratio adjustments would correspond to the full range of torque and angular deformation variations of which the torsion sleeve is capable. No adjusting of the input torque level close to which Qi* is to be maintained would be possible from a practical standpoint. Such a system would be of little value for automotive applications, for its potential could not be fully exploited. Vice versa, the slopes and number of the solid lines of FIG. 14 graphs should neither be too low nor too high, respectively, to the point where the system is overprecise and likely to hung for or oscillate about a mean stable condition.

For any set position of duct 177, the drive constitutes a closed control loop with its own built-in feedback. Its performance in terms of precision and stability depends ultimately on the characteristics of the engine and of the vehicle in terms of their respective response times, as compared to that of the drive. It is believed that the response time of the drive is small compared to those of the engine and especially of the vehicle. Furthermore, another response time is built-in between the engine control system and the drive, and which is caused by the response of piston 174*, hence of sleeve 170 and of the resulting speed ratio, to a position variation of positioning duct 177. Adjusting the size of restricting orifice 176 in piston 174* allows the introduction of means by which piston 174* response time can be lengthened by an amount that will cause any induced axially-oriented oscillations of sleeve 170 to dampen out.

At this stage, it can be safely assumed that at least five $\Delta Q$ steps will suffice for automobile applications and less than ten for bus and/or truck applications. $\Delta Q$ is equal then to the maximum engine torque divided by the number of steps q, where $5 < q < 10$. Duct 177, piston 174* and sleeve 170 will occupy either one of the q possible positions, as determined by computer 163, depending upon ambient conditions and requirements imposed by the driver via teh engine/vehicle control system. This case is the simplest and most straightforward drive control system. In another case, q could be much larger to a degree such that the positions of duct 177, piston 174* and sleeve 170 are adjusted whenever Qi* demanded by computer 163 varies by an amount larger than a set percentage of the engine maximum torque, between two and four percents for instance. The exact percentage number chosen should correspond to a few times that which corresponds to maximum oscillating torque amplitudes possible under the worst conditions of engine/vehicle coupling expected of and generated by the speed ratio control loop. This is to insure that beating conditions between the speed control loop and the torque level adjustment loop can never develop or remain sustained. The value of $\delta Qi$ and $\delta Q$ earlier mentioned could then be as low as one tenth of anticipated realistic values of $\Delta Q$ or $\Delta Qi$.

Because the capability of the full stroke of segments 42 must always correspond to the full range of speed ratio adjustments, the torque control function performed by FIG. 20 system may instead be assumed by the engine/vehicle control system. In such case, the positions of segments 42, hence the speed ratio, are directly imposed on the drive, as shown in FIG. 19. Computer 163 determines the speed ratio of the drive that meets the requirements set by the vehicle operational mode and the values of the engine operation parameters to be regulated for such mode, and sends the resulting signal to actuator 150. Acutator 150 then defines the position of sleeve 125, thus of segments 42 and then the value of the speed ratio r. In such case, actuator 150 could be of a rotary type and equipped with a pinion gear engaging a cooperating internal gear mounted on sleeve 125, in lieu of helical grooves 128.

A further modified embodiment of segments-42 positioning system could also consist of a modified sleeve 125 in which the helical slot arrangements are replaced by the sawtooth cam profiles depicted in FIG. 8. Followers 123 of FIG. 15 are synchronously pushed by the cam profiles against the outwardly-directed net forces exerted by the balls, as earlier mentioned. In such an arrangement, segments 42 cannot be pulled. If the directions of these net forces were to reverse, the positioning of positive segments 42 would become impossible. Such an operational condition could develop when the vehicle is put in reverse and if the rotational speed inverting device is located between the engine and the drive. This reverse drive condition now needs a brief discussion and applies to automotive applications only, excluding motorcycles. Drive Operation in Reverse:

The cylindrical drive system described in U.S. Pat. No. 4,739,668 provides a reverse speed operation capability. This is achieved by means of a feature that enables the balls within a ball-chain to invert their motion direction. Access to the ball-chain channels is required to that effect. In the present invention, such access appears difficult and the use of an independent speed-reversing device seems more promising. Such a device may be mounted either between the engine and the drive or between the drive and the power transmission axle. In the latter case, the operation of the speed-inverting device does not affect the drive mode of operation and no further discussion seems to be needed.

In the former case, inverting the rotational direction of the drive input shaft reverses the direction followed by the balls on their travel in the straight grooves. The direction of the forces resulting from all interactions between the balls and the helical grooves and reacting on segments 42 will also be inverted. It is unlikely that a particular ball channel could be designed for preventing such reaction inversion. Thus the positioning of segments 42 must be achieved positively, i.e. in a way such that segments 42 can be both pushed and pulled as the case may require.

The drive embodiments shown in FIG. 15 and 20 satisfy such requirements. However, the embodiment incorporating the modification briefly described above does not. In such case, the speed-inverting device should be located between the drive and the transmission axle. It should be mentioned here that the ranges of speed ratios offered in reverse drive and forward drive are the same. Such a dual capability could be of particular interest in applications to tractors or some earthmoving equipment. Devices for rotational speed inversion are state-of-the-art items and are well known throughout the industry. Further discussion here appears unwarranted.

Particular Design Aspects of the Drive

Only those design aspects that are specific to the drive embodiments of the present invention, in which each elementary ballchain is separate and contained in an individual segment, are reviewed below. Design aspects that are common to the drive embodiment of this invention and the cylindrical drive system (U.S. Pat. No. 4,739,668 reference) are discussed therein and need not be repeated here. Those pertain to the depth of the grooves, numbers of grooves, manufacturing problems, variations of groove depth as a function of spiral/-helix pitch angles, the necessity of interferences between adjacent grooves, the shaping of the ball pockets or receptacle cavities at both ends of the straight grooves, the ball anti-jamming features provided by such pockets between balls and between balls and grooved surfaces, etc.... These particular design aspects fall in the following categories:

flange support in the case of a planar embodiment;
design provision of the planar embodiment for bicycles;
optimum aspect ratio of the segment structure; and
optimum cone angle of a conically configured embodiment.

These four categories of subject matter are discussed separately below. Relationships between subject matters are discussed at the beginning of each sub-section pertaining to any given subject matter to be discussed later or already mentioned. Flange Support of Planar Embodiments:

The possible deformation of flat grooved flanges 36 and 40 of FIG. 1 and 7 under axially-oriented loads created by the wedge effects of balls 43 and 44 on the sides of the spiral grooves was discussed earlier. The range of speed ratios required for bicycle applications mandates that angles $\alpha$ and $\beta$ of FIG. 9 vary in opposite direction as circle $\Gamma$ radius varies. Segment-guiding structure 41 cannot be made rigid enough to maintain a fixed axial position of segments 42. It is therefore allowed to deform so as to maintain a mid-position between the two flange facing surfaces. These two surfaces tend to pull apart under the combined influences of the pair of axial loads exerted by the two balls of each segment that simultaneously interact with two corresponding and facing spiral grooves.

However, the axial distance separating these two corresponding spiral grooves should not be allowed to increase by more than a small fraction of the groove depth or an even smaller fraction of the ball diameter. If not, the ball could jump over the spiral groove ridge separating two adjacent grooves, whenever the height of the ridge from the groove bottom is about equal to the flange axial deformation at that location. Such occurrence is unacceptable. Even if the contact point of a ball restrained by a straight groove of a segment 42 with a spiral groove does not reach a ridge, the ball should not rise much above the spiral groove bottom. If it should, such operational condition would have a detrimental effect on the performance and life of the drive. It is believed that balls should not rise more than a few thousandths of an inch for balls with a diameter between one eighth and three sixteenths of an inch. Such diameter dimension range appears well representative for bicycle applications. A maximum ball rise in the range of 0.006 to 0.008 inch might then be tolerable.

This indicates that total grooved flange axial deflections at any point should remain below 0.005 inch from a nominal position (no load condition). As earlier mentioned, the inherent rigidity of the flanges cannot realistically be expected to satisfy such a requirement. However, flat thrust bearings such as 101 and 102 of FIG. 7 can transfer the axial loads exerted on flanges to the drive casing or housing that may be reinforced externally to minimize axial deflections. In addition to the thrust bearing rings shown in FIG. 7, other thrust rings concentric thereto can be added to rings 101 and 102, possibly one or two on each side. This deformation problem can be resolved with the addition of weight by means of casing structural reinforcements. Further discussion of weight penalty is beyond the scope of this disclosure. Drive Design Provisions for Bicycle Applications:

Casing 38 can easily be sealed as shown in FIG. 1, 3, 7 and 8 so that lubrication of the drive can be provided. It is believed that lubricating oil contained at the bottom of the casing up to level s, as illustrated in FIG. 7 at rest, will provide adequate lubrication to all moving parts. The rotation of the flanges will bring oil in contact with the balls when the bicycle is ridden and insure ample lubrication of segments 42 that do not rotate. The torque control mechanism also rotates (FIG. 3) and will be selflubricating. If an opening in casing 38 for torque level ajusting is provided as earlier mentioned, it should be located in the upper half of the casing. It can also be used for adding oil and/or visual checking of the lubrication. The cap of such opening can easily be made self-sealing. An oil drainage opening can also be provided at the bottom of casing 38.

The input torque applied by a bicycle rider is by necessity of a pulsating nature and of a freqeuncy twice higher than that at which axle 32 turns. The torque control system shown in FIG. 3 is continuously urging segments 42 to travel radially in and out in an attempt to keep the torque at its adjusted set level. In the process, the speed ratio will continuously vary concomitantly. If the torque level were controlled at a rigorously constant value, this condition would impose on the rider's legs demands near the top and bottom positions of the pedals that cannot be met practically. Also, values of the torque level set by spring 73 adjustments are not constant and vary with the amount of differential angular positions $\Delta\phi$ between flanges 70 and 76. $\Delta\phi$ corresponds to $\Delta\Psi$ of FIG. 14 where the solid line characteristics could also represent typical variations of Qi in function of $\Delta\Psi$.

In bicycle applications, both the torque and the angular speed delivered by the rider's feet to the pedal axle neither are constant nor need be. The inertia of the rider/bicycle mass plays the role of the flywheel of a piston engine. Power is delivered cyclically at the frequency mentioned above. As a rough approximation, for each half revolution of the pedal axle from top to bottom positions of the pedals, on each side of the bicycle, full or near full torque can be exerted over a rotation angle of 120 to 140 degrees centered about a horizontal reference plane passing through the pedal axle centerline. This leaves two "dead" (equivalent to free wheeling) angles of 40 to 60 degrees each, one at the bottom and another at the top of the circular paths of the pedals.

During the passage of the pedals through these dead angles, no significant amount of input torque should be expected from the rider and sprocket wheel 39 would act as power source were it not for the free wheeling nature of the connection between chain 100 and the bicycle rear wheel. The contribution of grooved flange 40 to the axial forces imposed on segments 42 almost ceases. The contribution of flange 76 to such forces also practically ceases. In such instance, the radial positions of segments 42 are mostly and only determined by the radial positions of pins 74. The latter positions are in turn set by the differential angular position between flanges 70 and 76 by means of the scissoring action of slots 75 and 77, as earlier stated. Only a small amount of input torque is then applied on flange 70 and spring 73 attempts to reduce angle $\Delta\phi$. The immediate consequence would be a sizable change of speed ratio r if provisions were not made to prevent this.

FIG. 5 schematic can be used to show such provisions and also explain how they help. Assuming that slot 75 of flange 70 rotates in direction f', only its inner contour a is used, its outer contour b serves no useful purpose. It could be disposed of and, for practical purpose, be made to follow profile line b'. With these conventions, it will be assumed that speed ratio r decreases when pin 74 moves outwardly in a direction opposite to that of arrow f and when Qi increases. Further, if it is assumed that the position shown for pin 74 halfway between the ends of slot 75 corresponds to input torque Qi being controlled during one pedal downstroke, the other pedal upstroke is of no concern here and thus ignored, a decrease of $\Delta\phi$ through the dead angle interval will not bring contour b' in contact with its related portion 79 of pin 74. The resulting falling back of flange 70 with respect to grooved flange 76 does not cause pin 74 to automatically move downward in arrow f direction, which would cause r to increase. Thus segments 42 are not forced to travel twice, in and out, during each revolution of pedal axle 32, they can keep their radial positions.

The falling back of flange 70, i.e. the decrease of angle $\Delta\phi$, should not unduly be perceived or felt by the rider as a brusque change imposed on the circular motion of the pedals. So as to render such feeling less noticeable, the maximum value of $\Delta\phi$ should be kept lower than the dead angle value. For instance, that maximum value could be 20 to 25 degrees. It is believed that possibly three adjustments of spring 73 will provide an adequate range of the input torque settings: one LOW for less energetic riders or tired riders, one MEDIUM for average strength riders and one HIGH for strong riders in good conditions. This corresponds to three straight solid lines in FIG. 14. A bicycle equipped with such type of drive would be ridden by only one rider. The strength of spring 73 or its stiffness determines the sensitivity of the torque control. For each given rider, it is believed that such sensitivity $\delta Qi/\delta\Psi$, i.e. $\delta Qi/\delta r$, should be proportional to the maximum torque with which this rider feels comfortable. Spring 73 stiffness determines the value of $\delta Qi/\delta r$ and the range of the strength of riders could easily vary by a factor of four. Adjustment of the tension of spring 73 does not affect $\delta Qi/\delta r$, only changing its stiffness does. In conclusion, the torque control system of drive of the present invention for bicycle applications can most effectively be used when possibilities of changing spring 73 and of adjusting its initial tension are combined.

The tension loads developed by spring 81, the opposing forces exerted by forcibly-bent curved foils 80 and the radial reactions applied by segments 42 combine to result in radially-oriented forces exerted on pins 74 at all times. However, these resultant forces are much smaller than the radially-oriented loads which could be imposed on pins 74 by the scissoring action of slots 75 and 77 whenever the torque is being regulated, i.e. pins 74 locatd between the ends of slots 75. It should be emphasized through that the input torque should never be transmitted by pins 74, but only by spring 73, whether or not it is extended or at its initial setting. In the former case, the drive is controlling r to maintain Qi about a set value; in the latter case, r is at its highest value and the rider is not yet exerting the maximum input torque value that is not to be exceeded, within the regulating range $\Delta Qi$.

In the latter case, torque Qi would be transmitted by pins 74 that would then be contacting the botttom ends of slots 75 and 77 (FIG. 5) and spring 73 could remain largely inoperative. It is believed that neither pins 74 nor slots 75 and 77 should operate under such indeterminate conditions, for reasons that readers familiar with the art will easily recognize. Thus a plurality of stops, 70* on flange 70 and 76* on flange 76, come into contact with one another just before pins 74 reach the bottom ends of slots 75 and 77. In such case, flanges 70 and 76 become positively linked and the input torque is directly transmitted between the two flanges by part of spring 73 initial tension, by-passing the action of both spring 73 and pins 74. Whenever the rider increases the pedalling efforts to a level that exceeds the setting Qi or initial tension of spring 73, stops 70* and 76* separate, the scissoring action of slots 75 and 77 comes into effect and pins 74 begin to move radially and outwardly. The torque regulation then takes over.

Such torque regulation also takes effect whenever the rider wants to accelerate on a level road or when the road grade increases. Acceleration phases are of short duration, whereas the ascension of long road grades will generally last much longer. The maximum torque that riders can comfortably exert in both instances are different in value, which is a disadvantage, but is believed that this may be more than compensated by the fact that automatic speed ratio adjustment is available throughout the acceleration period. Such operational condition of a bicycle could prove very beneficial though to any rider who has learned how to take full advantage of this feature.

Segment Structure Optimum Design and Drive Cone Angle:

In both drive configurations, planar and conical, the thickness of the segment structures should be kept at a minimum. This is easily understandable for bicycle applications in which casing 38 side profile should be kept as thin as possible. This requirement is less obvious in the case of conical configurations. However, as an examination of the drawings of FIG. 15, 16, 17 and 18 reveals it seems that: (1) the ratio between the end diameters of central body 111 should not exceed two, (2) the small end diameter should be large enough to accommodate both segments and their guiding structure, (3) the segment thickness has a pronounced influence on the drive outer diameter, and (4) a large cone angle would only trade drive overall length at the cost of greatly increased drive outer diameter.

Only a study of each specific application of a conical drive can determine the optimum trade-off between drive length and greater outer diameter. However, the cone half-angle A (FIG. 15) should probably remain less than thirty degrees as a rule, unless length is extremely critical. If so, it is even more important that the segment thickness be kept at a minimum value. A numerical example based on a drive design with nine segments is used as a model for comparison below. A ball diameter of 0.200 inch is assumed to be realistic in drives for average-size car applications. This comparison is based on two extreme segment structure designs, one in which groove-interacting balls are in the same axial plane as depicted in FIGS. 1, 2, 3, 4, 7 and 15, and another in which the ball positions are offset as shown in FIGS. 16, 17 and 18 for instance. The first case is referred to as stackup ball design and the second case is referred to as parallel ball design. It can also be safely assumed that the radius of curvature of the centerlines of channels 141 and 142 (FIG. 17) must be at least equal to two ball diameters for ease of passage of the balls through those channels.

With the design assumptions made above, the segment width W must be at least four ball diameters or 0.800 inch for a parallel ball design. The segment thickness could be less than three ball radii. In a stackup ball design, the width W could be reduced to two ball diameters, but the segment thickness would have to be as much as four ball diameters (0.800 inch). The drawings of FIGS. 15, 16 and 18 can be used to visualize the influence of the ratio W/h, where h is the segment thickness. It seems obvious that thin segment structures are preferable. However, the design constraints imposed by the lateral support and guiding that the segments must receive should now be examined.

The total circumferential length occupied by the segments is 9W or 7.200 inches for the parallel ball design. At least a quarter of W must be available per segment for support and guidance. The total minimum means circumferential length of the segments and supporting structures (small end of conical sleeve 117) must then be between 9 and 10 inches. This corresponds roughly to a 3-inch diameter. As a rule of thumb, this minimum diameter is equal to approximately 15 times the ball diameters. The average thickness of the segment structure will then be between 0.300 and 0.350 inch. This explains why the influence of radius variations on speed ratio, as a function of segment axial displacement, could be neglected as a first approximation, as previously done herein.

Segments of the stackup ball design have a thickness of 0.800 inch and a width of 0.400 inch. The circumferential length occupied per segment is half of that previously mentioned for a parallel ball design but the concomitant increase in diameter of sleeve 117 is twice as large. It is left to the reader to determine which approach is most attractive for a given application in which set space limitations and/or torque performance criteria are defined. However, it can be stated that a stackup ball design would allow a larger number of segments, which would enable more balls to become engaged for torque transmission, at any one time. Also, the influence of ball arrangement, i.e. stackup vs parallel, in the segment on the stability thereof between and with respect to its guiding means cannot realistically be discussed here. It should be investigated by any designer/user though, because it will affect the interactions between engaged balls and helical grooves.

The determination of the optimum cone angle is related to the ball arrangement discussed above. It is intuitively felt that cone angles will probably fall between thirty and fifty degrees. Again, designing the drive for a specific application will help define the most appropriate cone angle value, taking into account the influence thereon of each one of the two extreme ball arrangements.

Constant lubrication of the drive components will be required as it is in the case of gearboxes. Both rotating and sliding parts need only be in contact with lubricting oil once during each revolution of central body 111 and sleeve 117. The bottom of drive housing 116 may be used as a sump in which oil level is indicated by line L in FIG. 15 as an example, when the drive is at rest.

Concluding Remarks

In conclusion, the basic embodiment of the present invention and its various construction forms hreinabove described and discussed provide a non-cylindrical positive IV drive that operates without slippage by simultaneously and continuously engaging a plurality of balls between corresponding and cooperating grooves arranged in pairs, one straight and another curved. Between engagements, the balls roll in guiding and restraining channels while transmitting thrust vectors that serve as in-between steps in the transmission of power and conversion of torque. Load-transferring sliding motions are limited to those of groove-interacting balls, thereby limiting the amount of power losses due to solid friction. The ball chain contained in each one of the ball guiding and restraining channel forms a closed loop and is not directly connected to any other ball chain of the drive. The individual mobile structures housing the ball chains, one ball chain for each structure segment, are thus structurally independent from one another, although actuated and operated to move synchronously.

Two configurations the basic embodiment are ideally adaptable each one to one type of transportation vehicle: (1) bicycles, for which the curved grooves are spirally-laid along parallel planar surfaces; and (2) automobiles, buses and/or trucks, for which the curved grooves are helically-laid along concentric conical surfaces. The IV feature and the manner in which those embodiment configurations can be constructed enable adaptation to both vehicle types so that each one can operate in such a way that the torque applied to the input shaft may either be adjusted, controlled or limited by setting the ball-chain position automatically internally by the IV drive itself of imposed externally in form of speed ratio. In bicycle applications, it provides an automatic limit to the amount of foot pressure required of the rider. In automotive applications, it provides the means needed for applying speed ratio-adjusting command signals generated by an external control system that monitors the engine/vehicle coupling mode.

In the case of the latter application, the ability provided by the present IV drive to adjust the speed ratio, hence the torque ratio, between the engine power output shaft and a vehicle transmission axle enables a driver to optimize the vehicle performance for any driver-selected operation mode of the vehicle. Such operation mode could be: (1) vehicle velocity automatic control, (2) automatic control of the engine operation at its minimum specific fuel consumption regime, and (3) automatic control of the vehicle acceleration according to an optimized program of minimum fuel consumption (U.S. Pat. No. 4,747,269). The most obvious end results amongst others are:

1. appreciable fuel saving throughout the vehicle life;
2. minimized driving stress level for the driver;
3. easier vehicle handling;
4. reduction of pollutant emission throughout the vehicle life;
5. minimized wear of engine and vehicle components; and
6. minimized risks of engine stall.

Other advantages pertaining to vehicle operation will be evident to readers familiar with the art. The major advantage being fuel saving for equal or even superior vehicle performance and longer engine life. The operating cost of the vehicle is also reduced concomitantly. The reduction in pollutant production will be more pronounced during city driving where and when it is most critical and usually predominant. The application to bicycles will render cycling more attractive to those cyclists who enjoy riding on hilly roads. The levels of stress and strain imposed on foot and leg muscles will also be reduced.

Therefore, it is believed that the positive IV drive of this invention and the operation method thereof and many of its attendant advantages will be understood from the foregoing description and it will be apparent that various changes may be made in the form, construction and arrangement of the parts thereof without departing from the spirit and scope of the present invention or sacrificing any and all of its material advantages, the form described hereinbefore being merely a preferred or examplary embodiment thereof.

Having thus described my invention, I now claim:

1. An infinitely-variable (IV) mechanical drive for positively transmitting power and converting torque, and comprising:

a centrally located first power shaft for rotation around a drive axis;

a centrally located second power shaft substantially in line with said first power shaft for rotation around the drive axis;

first body of revolution means mounted on the second power shaft for rotation around the drive axis;

ball means located between corresponding facing surfaces of said first and second body of revolution means for transmitting torque and angular motion between said first and second power shafts, the ball means including a plurality of non-rotatable segments enabled to slide linearly and synchronously, the direction of motion of said sliding intersecting the drive axis, each one of such segment containing and retaining balls arranged to form a substantially continuous ball chain within said segment and urged to create a plurality of sets (one of each segment) of balls in alternate engagement with two opposite segment faces and the corresponding facing surfaces of said first and second body of revolution means, thereby creating circumferentially distributed ball-chain mechanical links between said first and second body of revolution means; following means attached to the segments for adjusting their linear sliding position; cams means partially rotatable about the drive axis for actuating the following means of the segments; an external structure for holding the first power shaft and the second power shaft in line, and for mounting the mechanical drive;

non-rotatable and linearly guiding means located both on two opposite sides of each segment and between continuous segments for restraining the segments and associated ball chains against segment lateral displacements in the directions of rotation of the first and second body of revolution means, and between two substantially parallel facing surfaces of revolution means, and between two substantially parallel facing surfaces of revolution formed by the corresponding facing surfaces of said first and second body of revolution means;

fixed structural means attached to the external structure for mounting the non-rotatable and linearly guiding means located between two contiguous segments;

helically oriented groove means located on the facing surface of the first body of revolution means;

helically oriented groove means located on the facing surface of the second body of revolution means;

a set of straight groove means for linearly guiding balls engaged therein, one straight groove being located on each one of the two opposite faces of each segment and oriented parallel to the parallel facing surfaces of revolution and to the direction of the sliding motion of the segment so as to intersect the helical groove means of said first and second body of revolution means, each straight groove having a length shorter than one ball diameter and being enabled to guide a ball engaged within said length and to prevent the rotation of said engaged ball along the directions of rotation of said first and second body of revolution means, and each straight groove being thus enabled to prevent more than one ball from being engaged in each straight groove at any time;

means for urging a plurality of the balls to ride in and remain constrained between corresponding sets of helical groove means and cooperating associated straight groove means; and ball engagement-facilitating means located at each one of the two ends of each straight groove for enabling a ball ready to become engaged to wait until a helically oriented groove becomes positioned to accept said waiting ball;

whereby a rotation of one of said first power shaft or said second power shaft causes said first body helically oriented groove means or said second body helically oriented groove means, respectively, to cooperate with said straight groove means for forcibly urging said continuous chains of balls to move around said segments, the cooperating engagement of said balls with said straight groove means and an other of said first body helically oriented groove means or said second body helically oriented groove means causes rotation of an other of said first power shaft or said second power shaft, respectively.

2. The IV drive according to claim 1 wherein the corresponding facing surfaces of the first and second body of revolution means are conical and concentric, and wherein the non-rotatable and linearly guiding means for restraining the segments and associated ball chains are interposed between said corresponding facing surfaces of the first and second body of revolution means so as to enable segments and associated engaged balls to move in directions parallel to a fixed pair of corresponding facing generatrices of the conical facing surfaces of the first and second body of revolution means.

3. The IV drive according to claim 2 wherein angles at which the helically oriented groove means intersect the straight groove means vary monotonically along the length of said helically oriented grooves means between each one of two ends of each one of said helically oriented grooves, and wherein each one of the helically oriented grooves is adjacent to two other contiguous helically oriented grooves from one end to an other end of said groove.

4. The IV drive according to claim 3 wherein the intersecting angle of one of the helically oriented groove means is fixed and the intersecting angle of the other helically oriented groove means progressively and monotonically varies along each helical groove length.

5. The IV drive according to claim 3 wherein the intersecting angles of the helically oriented groove means of the first and second body of the revolution means progressively and monotonically vary along each helical groove length, in an inverse manner so that one angle increases for one helically oriented groove means whereas the other angle decreases for the other helically oriented groove means.

6. The IV drive according to claim 3 wherein the segment positions along their sliding displacements determine combinations of intersecting angles of the helically oriented grooves on corresponding facing surfaces of revolution so as to establish ratios between the angular speeds of the first and second power shafts, in an infinetely variable manner, and relative winding orientations of helically oriented grooves determine the relative rotation directions of the first and second power shafts.

7. The IV drive according to claim 1 wherein the corresponding facing surfaces of the first and second body of revolution means are planar and parallel, and wherein the non-rotatable and linearly guiding means for restraining the segments and associated ball chains are interposed between said corresponding facing surfaces of the first and second body of revolution means so as to enable segments and associated engaged balls to move in directions parallel to a fixed pair of corresponding radially-oriented facing directions that are orthogonal to the drive axis.

8. The IV drive according to claim 7 wherein the helically oriented groove means projected on the planar facing surfaces of the first and second body of revolution means form spirally-shaped grooves, and wherein angles at which said spirally-shaped grooves intersect the straight groove means vary monotonically along the length of said spirally-oriented grooves between each one of two ends of each one of the spirally-oriented grooves, and wherein each one of the spirally-oriented grooves is adjacent to two other contiguous spirally-oriented grooves from one end to an other end of said groove.

9. The IV drive according to claim 8 wherein the intersecting angle of the spirally-shaped grooves located on the facing surface of the first body of revolution means is fixed and the intersecting angle of the spirally-shaped grooves located on the second body of revolution means varies progressively and monotonically along a length of each one of the spirally-shaped grooves.

10. The IV drive according to claim 8 wherein the intersecting angles of the spirally-shaped grooves located on the facing surfaces of the first and second body of revolution means vary inversely, in a decreasing manner for one facing surface and in an increasing manner for the other facing surface.

11. The IV drive according to claim 8 wherein the segment positions along their sliding displacements determine combinations of intersecting angles of the spirally-shaped grooves on corresponding facing surfaces of revolution so as to establish ratios between the angular speeds of the first and second power shafts, in an infinitely variable manner, and relative spiralling orientations of the spirally-shaped grooves determine the the relative rotation directions of the first and second power shafts.

12. The IV drive according to claim 1 wherein the external structure supports means for actuating the cams means and further comprising:
   means for simultaneously and synchronously adjusting the segment positions and therefore the positions of engaged balls;
   whereby the segments slide simultaneously an equal distance and the positions of all balls engaged between cooperating helically oriented grooves and straight grooves correspond to a substantially and continuously equal radial distance from the drive axis at all times.

13. The IV drive according to claim 12 wherein the two opposite faces of each segment and the two opposite sides thereof define a segment structure that houses all balls in the ball chain contained in said segment and guided in a ball channel independently from other ball chains contained in other segment ball channels so as to form a plurality of such continuous closed-loop channels, one in each segment, and further comprising:
   means for enabling a ball in each channel to partially emerge externally to the segment structure to enter a straight groove and to protrude beyond the segment face on which said straight groove is located; and
   means for enabling a ball emerging from a channel to progressively engage a cooperating helically oriented groove;
   whereby each one of fully emerged and protruding balls is enabled to maintain a positive and singularly positioned engagement between said straight groove and said cooperating helically oriented groove for a distance substantially equal to one ball diameter.

14. The IV drive according to claim 13 wherein construction means is provided by a combination of the number of balls in each one of the channels and of the number of channels in the drive:
   for enabling at least one ball in each one of the segments to positively engage one straight groove and one cooperating helically oriented groove;
   for enabling at least three balls, one ball in each one of three substantially equally angularly-spaced segments, to be positively engaged at all times; and
   for enabling each one of sid three engaged balls to terminate its engagement at a time substantially equally distributed between the times at which the two other ball terminate their engagements.

15. The IV drive according to claim 13 wherein the fixed structural means for mounting the non-rotatable and linearly guiding means further includes:

structural means for resisting a laterally oriented loads exerted on the segments by engaged balls and for transmitting said loads to the external structure; and structural sliding guiding means for maintaining the segment opposite faces and the facing surfaces of revolution substantially parallel at all times; and whereby the segments are enabled to respond freely to loads applied thereon and oriented in the direction of the segment sliding motion and exerted by engaged balls, adn to forces applied for adjusting the position thereof.

16. The IV drive according to claim 13 wherein the ball chain channel is constructed to enable one of the balls engaged in one of the two opposite straight grooves of a segment and an other ball engaged in an other of the straight grooves to travel in opposite directions.

17. The IV drive according to claim 1 wherein the helically oriented groove means located on the facing surface of the first body of revolution means and the helically oriented groove means located on the facing surface of the second body of revolution means are oriented in the same helical winding direction.

18. The IV drive according to claim 1 wherein the helically oriented groove means located on the facing surface of the first body of revolution means and the helically oriented groove means located on the facing surface of the second body of revolution means are oriented in opposite helical winding directions.

19. The IV drive according to claim 1 wherein the non-rotatable and linearly guiding means enables the segments to be simultaneously and synchronously positioned along their linear travels, and wherein angles at which the straight groove means intersect the helically oriented groove means vary as the segment linear positions vary, thereby enabling each segment position to correspond to a determined ratio between the rotational speeds of the first and second power shafts, whereby adjusting the segment sliding position results in adjusting the drive speed ratio concomitantly and automatically.

20. The IV drive according to claim 19 wherein manually actuated means is provided for enabling an operator to position the segments, thereby providing manual adjustment of the rotation speed ratio between the first and second power shafts.

21. The IV drive according to claim 19 wherein torque adjusting means is provided for controlling the torque exerted on the first power shaft, and said torque adjusting means further comprises:

means for measuring said torque;
means for generating a signal representative of the amount of said torque;
means for comparing said signal value to an adjustable set value; and
actuating means for enabling the segment position to adjust, thereby adjusting the drive speed ratio and concomitantly a ratio between the torques transmitted by the first and second power shafts, so as to cause the signal value and the adjustable set value to substantially coincide automatically;
whereby the torque transmitted by the first power shaft is automatically held substantially constant at the adjusted set value.

22. The IV drive according to claim 21 wherein torque level adjusting means is provided for setting the value of the amount of torque to be transmitted by the first power shaft.

23. The IV drive according to claim 22 wherein the torque level adjusting means enables the drive to control the amount of torque transmitted by the first power shaft in response to a signal generated internally to the drive.

24. The IV drive according to claim 22 wherein the torque level adjusting means enables the drive to control the ratio between the rotational speeds of the first and second power shafts in response to a signal generated externally to the drive and received thereby.

25. The IV drive according to claim 22 wherein the torque level adjusting means enables the drive to control the torque transmitted by the first power shaft in response to a signal generated externally to the drive and received thereby.

26. A method of positively transmitting power and converting torque between a first power shaft and a second power shaft of an IV drive, said shafts being centrally located for rotation around a drive axis and in line with one another, in said IV (infinitely variable ratio) drive by means of a plurality of independent ball chains urged to travel by a first body of revolution mounted on the first power shaft while said balls chains are guided and restrained by separate channels contained in a plurality of synchronously sliding separate segments, one channel being housed in each one segment, for mechanical engagement with a second body of revolution mounted on the second power shaft so as to cause said second power shaft to rotate, the first and second body of revolution having facing surfaces of revolution arranged to remain parallel as the first and second power shafts rotate, each facing surface of revolution being covered with adjacent helically laid grooves, the segments being interposed between said parallel facing surfaces of revolution and having two opposite faces, each one containing a straight groove into which the ball chain channel opens, one facing the first body of revolution facing surface and the other facing the second body of revolution facing surface, the straight grooves being oriented in directions which intersect the drive axis and being constructed so a to urge balls to partially protrude externally to the segment faces when emerging from their guiding channels thereby enabling partially protruding balls to engage halically laid grooves and thereby requiring relative rotation of the first and second bodies of revolution with respect to the segments that are being prevented from rotating by fixed structural means attached to an external structure of the IV drive and located between the segments, whereby a rotation of one of said first power shaft or second power shaft causes said first body of revolution or second body of revolution, respectively, to cooperate with said straight grooves for forcibly urging said ball chains to travel along said channels, the cooperating engagement of said balls with said straight grooves and an other of said first body helically-laid grooves or said second body helically-laid grooves causes rotation of an other of said first power shaft or said second power shaft, respectively, thereby providing positive mechanical linkage by means of said ball chains connecting the first power shaft to the second power shaft, and wherein said straight grooves intersect the helically-laid grooves at angles of magnitude varying with the positions of the segments along their travel strokes, thereby enabling the ratio between the rotational speeds of the first and second power shafts to vary as the segment positions are adjusted along said travel strokes by segment actuating and positioning means, said method comprising the steps of:

adjusting simultaneously the positions of all segments so as to locate them at equal distances from the drive axis for causing balls engaged between a straight groove and a cooperating helically-laid groove on each one of the two facing surfaces of revolution to be also positioned at equal distances from the drive axis, thereby determining a value of the rotational speed ratio between the first and second power shafts; and enabling the positions of engaged balls on the helically-laid grooves to synchronously vary along the length of said grooves so as to enable the rotational speed ratio between said first and second power shafts to reach and to maintain a set value in an infinitely variable manner.

27. The method recited in claim 26 wherein control means is provided for measuring and for automatically adjusting the torque level amount transmitted by the first power shaft, said method comprising the further steps of:

setting the torque level amount to be exerted on the IV drive; and enabling the segment positions to adjust continuously and simultaneously so as to vary the drive rotational speed ratio, therefore the torque ratio between the first and second power shafts, so that the amount of torque transmitted by the first power shaft remains substantially constant and equal to the set value of the torque level.

* * * * *